(12) United States Patent
Jeon

(10) Patent No.: US 11,990,639 B2
(45) Date of Patent: *May 21, 2024

(54) POLYLACTAM COATED SEPARATOR MEMBRANES FOR LITHIUM ION SECONDARY BATTERIES AND RELATED COATING FORMULATIONS

(71) Applicant: Celgard, LLC, Charlotte, NC (US)

(72) Inventor: Insik Jeon, Ithaca, NY (US)

(73) Assignee: Celgard, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,776

(22) Filed: Oct. 12, 2021

(65) Prior Publication Data

US 2022/0029245 A1   Jan. 27, 2022

Related U.S. Application Data

(62) Division of application No. 17/103,741, filed on Nov. 24, 2020, now Pat. No. 11,721,872, which is a division of application No. 15/962,018, filed on Apr. 25, 2018, now Pat. No. 10,879,514, which is a division of application No. 14/982,466, filed on Dec. 29, 2015, now Pat. No. 9,985,263.

(60) Provisional application No. 62/099,636, filed on Jan. 5, 2015, provisional application No. 62/097,199, filed on Dec. 29, 2014.

(51) Int. Cl.
| | | |
|---|---|---|
| *H01M 50/417* | (2021.01) | |
| *H01M 10/0525* | (2010.01) | |
| *H01M 50/446* | (2021.01) | |
| *H01M 50/449* | (2021.01) | |
| *H01M 50/489* | (2021.01) | |

(52) U.S. Cl.
CPC ....... *H01M 50/417* (2021.01); *H01M 50/449* (2021.01); *H01M 50/489* (2021.01); *H01M 10/0525* (2013.01); *H01M 50/446* (2021.01)

(58) Field of Classification Search
None
See application file for complete search history.

(56) References Cited

U.S. PATENT DOCUMENTS

| | | | | |
|---|---|---|---|---|
| 9,985,263 B2 * | 5/2018 | Jeon | ..................... | H01M 50/411 |
| 10,879,514 B2 * | 12/2020 | Jeon | ..................... | H01M 50/417 |

(Continued)

FOREIGN PATENT DOCUMENTS

| | | |
|---|---|---|
| EP | 1096561 | 5/2001 |
| JP | 2013187196 | 9/2013 |

(Continued)

*Primary Examiner* — Gregg Cantelmo
(74) *Attorney, Agent, or Firm* — Hammer & Associates, P.C.

(57) ABSTRACT

The present invention is preferably directed to a polylactam ceramic coating for a microporous battery separator for a lithium ion secondary battery and a method of making this formulation and application of this formulation to make a coated microporous battery separator. The preferred inventive coating has excellent thermal and chemical stability, excellent adhesion to microporous base substrate, membrane, and/or electrode, improved binding properties to ceramic particles and/or has improved or excellent resistance to thermal shrinkage, dimensional integrity, and/or oxidation stability when used in a rechargeable lithium ion battery.

14 Claims, 10 Drawing Sheets

(56) References Cited

U.S. PATENT DOCUMENTS

| | | |
|---|---|---|
| 2005/0014063 A1 | 1/2005 | Shi et al. |
| 2010/0316903 A1 | 12/2010 | Kim et al. |
| 2011/0003209 A1* | 1/2011 | Katayama ............. H01M 50/44 |
| | | 429/246 |
| 2011/0229768 A1 | 9/2011 | Pan et al. |
| 2011/0293990 A1 | 12/2011 | Ryu et al. |
| 2012/0308898 A1 | 12/2012 | Sawomoto et al. |
| 2013/0236765 A1 | 9/2013 | Zhang et al. |
| 2013/0316219 A1 | 11/2013 | Ha et al. |
| 2014/0141314 A1 | 5/2014 | Kaneda |
| 2015/0228952 A1 | 8/2015 | Chen et al. |
| 2016/0028067 A1* | 1/2016 | Pekala ................ H01M 50/489 |
| | | 156/247 |
| 2021/0083253 A1* | 3/2021 | Jeon .................... H01M 50/489 |

FOREIGN PATENT DOCUMENTS

| | | | |
|---|---|---|---|
| JP | 2014141638 | 8/2014 | |
| JP | 2014534570 | 12/2014 | |
| WO | WO-2009069928 A2 * | 6/2009 | ................ C08J 5/22 |
| WO | WO2014066310 | 5/2014 | |
| WO | WO2014092234 | 6/2014 | |
| WO | WO2014145849 | 9/2014 | |

* cited by examiner

Proposed Adhesion Mechanism of PVP

POLYLACTAM COATED SEPARATOR MEMBRANES FOR LITHIUM ION SECONDARY BATTERIES AND RELATED COATING FORMULATIONS

CROSS-REFERENCE TO RELATED APPLICATIONS

This application claims priority to and the benefit of co-pending U.S. application Ser. No. 17/103,741, filed on Nov. 24, 2020, which claimed priority to U.S. application Ser. No. 15/962,018, filed on Apr. 25, 2018, and Issued as U.S. Pat. No. 10,879,514 on Oct. 29, 2020, which is a division of U.S. application Ser. No. 14/982,466, filed on Dec. 29, 2015, and Issued as U.S. Pat. No. 9,985,263 on May 29, 2018; which claimed priority to U.S. Provisional Application No. 62/097,199, filed on Dec. 29, 2014, and U.S. Provisional Application No. 62/099,636, filed on Jan. 5, 2015, which are each incorporated herein by reference in their entireties.

FIELD OF THE INVENTION

The present invention is directed to lithium battery separators, coated separators, formulations, and/or related methods. In accordance with at least selected embodiments, aspects or objects, a polylactam coating for a battery separator for a lithium ion secondary battery and/or a method of making such a polylactam formulations and/or application of this formulation to make a coated battery separator are provided. In accordance with at least certain selected embodiments, aspects or objects, a polylactam ceramic coating for a microporous battery separator for a lithium ion secondary battery and/or a method of making this polylactam formulation and/or application of this formulation to make a coated microporous battery separator are provided. The preferred inventive coating may have excellent thermal and chemical stability, excellent adhesion to microporous base substrate, membrane, and/or electrode, improved binding properties to ceramic particles and improved, optimized, novel, or excellent resistance to thermal shrinkage, dimensional integrity, and/or oxidation stability when used in a rechargeable lithium battery, such as a secondary lithium ion battery.

BACKGROUND OF THE INVENTION

High temperature melt integrity microporous separator membranes for lithium ion batteries exist in the art. Japan Patent Application No. JP 2014141638 discloses an aromatic-polyamide (aramid) porous membrane which claims to provide heat resistance in a non-aqueous secondary lithium ion battery. The aramid polymeric binder proposed as a high temperature coating requires a non-aqueous solvent such as N-methyl pyrrolidone (NMP) in order to form a coating solution. An aramid is not soluble in water. The coating process involves a phase separation in order to form a porous coating on a membrane. In addition, an aramid may be required to be mixed with a polymer containing a polar substituent due to the aramid's tendency to aggregate in solution and its difficulty to form a uniform coating on a porous membrane.

U.S. Patent Publication No. US2014/0141314 proposes a (meth)acrylic polymeric binder with the ceramic particles in an aqueous medium as the coating slurry for a polymeric ceramic coating for a microporous separator membrane for a lithium ion rechargeable battery. However, certain acrylate polymeric binders may be prone to chain scission along the backbone of the vinyl polymer in certain electrolytes in a lithium ion battery and therefore may not be highly chemically stable polymeric binders in certain applications. Furthermore, U.S. Patent Publication No. 2014/0141314 proposes that spherical shaped ceramic particles with fine surface irregularities may be preferred in order for a (meth) acrylic polymeric binder/ceramic coating to have adhesion between the ceramic particles and the binder in the coating layer and, in addition, to achieve adhesion of the polymer ceramic coating layer to the porous base membrane so that ceramic particles do not flake off when the membrane is handled.

U.S. Patent Publication No. US2011/0229768 discloses a method for modifying a microporous separator membrane for use in a polymeric ceramic coating for a microporous separator membrane for a lithium ion rechargeable battery. This method uses a polymeric binder that is prepared by the polymerization of a mixture of several hydrophilic and hydrophobic monomers in a variety of monomeric ratios and combinations. The colloid coating slurry requires a plasticizer, a polyethylene wax powder and a surface treated ceramic particle in order to prepare a stable emulsified coating slurry. The objective of applying the coating slurry onto a microporous separator membrane is to improve the dimensional integrity of a microporous separator membrane and to reduce the shrinkage of a microporous separator membrane at high temperature, which might allow contact between the anode and cathode resulting a short circuit in a battery. However, the coated examples in U.S. Patent Publication No. US2011/0229768 achieved only an 18-24% thermal shrinkage at 150° C. which may not be a sufficient level of reduction in the thermal shrinkage to provide the needed level of safety required at high temperatures in certain high energy rechargeable lithium ion batteries.

A ceramic coated composite separator membrane with low or zero thermal shrinkage may be highly desirable for use in Li-ion batteries, especially for electric vehicles and high energy and power applications. Safety is a top priority for secondary lithium ion batteries.

Therefore, for at least certain applications, a need exists for a novel or improved coating formulation that not only provides a clean, environmentally friendly coating process that uses water or a mixture of water as the solvent in the coating slurry, but also uses a polymeric binder that has high thermal stability for extended high temperature shutdown, reduced thermal shrinkage with improved and/or excellent dimensional integrity, and/or oxidation stability when used in a lithium battery, such as a high energy rechargeable lithium ion battery.

SUMMARY OF THE INVENTION

In accordance with at least selected embodiments, aspects or objects, the present invention may address the above needs and/or provide a novel or improved coating formulation that not only provides a clean, environmentally friendly coating process that uses water or a mixture of water as the solvent in the coating slurry, but also uses a polymeric binder that has high thermal stability for extended high temperature shutdown, reduced thermal shrinkage with improved and/or excellent dimensional integrity, and/or oxidation stability when used in a lithium battery, such as a high energy rechargeable lithium ion battery.

In accordance with at least selected embodiments, aspects or objects, the present invention is directed to lithium battery separators, coated separators, coating formulations, and/or related methods, to a polylactam coating, to a polylactam ceramic coating for a microporous battery separator for a lithium ion secondary battery and/or a method of making this formulation and/or application of this formulation to make a coated microporous battery separator, to an inventive coating that has excellent thermal and/or chemical stability, excellent adhesion to microporous base substrate, membrane, and/or electrode, improved binding properties to ceramic particles, and/or has improved, optimized, novel, and/or excellent resistance to thermal shrinkage, and/or dimensional integrity and/or oxidation stability when used in a rechargeable lithium battery such as a secondary lithium ion battery.

In accordance with at least particular embodiments, the inventive composite microporous membrane and/or separator comprises a coating comprised of a polylactam polymeric binder combined with inorganic particles in an aqueous medium, which is formed on at least one layer and/or one surface of a microporous polyolefin separator membrane for use as a battery separator in a lithium ion secondary battery. The preferred inventive coating may have increased thermal stability at high temperatures due to the highly thermostable cyclic amide chemical structure of a lactam. A polylactam polymer (where certain preferred examples include one or more polyvinylpyrrolidone (PVP) polymers) is a novel binder polymer for a polymer/ceramic coating for a polyolefin membrane for a lithium ion battery when compared with other binder polymers known in the art such as polyvinyl alcohol (PVA), polyacrylic acid (PAA), polyvinyl acetate (PVAc) and carboxymethyl cellulose (CMC). A polylactam polymeric binder has a higher temperature of decomposition than PVA, PAA, PVAc and CMC. Therefore, PVP is a more thermally stable polymer, and when combined with ceramic particles in an aqueous medium may provide an improved high temperature coating for a microporous separator membrane for a lithium ion rechargeable battery.

In addition, the inventive polylactam ceramic coating, when applied to one or more sides or surfaces of a microporous separator membrane, may provide reduced machine direction and/or transverse direction thermal shrinkage under various conditions, by way of example only, up to 150° C., or more, for up to 1 hour, or more. Lower thermal shrinkage of a microporous separator membrane may be considered a critical performance property because decreased machine direction and/or transverse direction dimensional shrinking reduces the chance of physical contact between cathode and anode during repeated battery cycling, resulting in improved temperature related safety performance when used as a separator membrane in a rechargeable lithium ion battery. A ceramic coated composite separator with either low or zero thermal shrinkage may be highly desirable for use in Li-ion batteries, especially for electric vehicles and high energy and power applications. Safety is a top priority in secondary lithium ion batteries.

In addition, PVP may have good oxidation stability with little or no discoloration in organic electrolytes that are typically used in lithium ion batteries, and/or it may provide stability to a PVP-rich ceramic coated separator membrane in the harsh environment of certain electrolytes used for certain lithium ion batteries.

DETAILED DESCRIPTION OF THE INVENTION

Figure 1A:
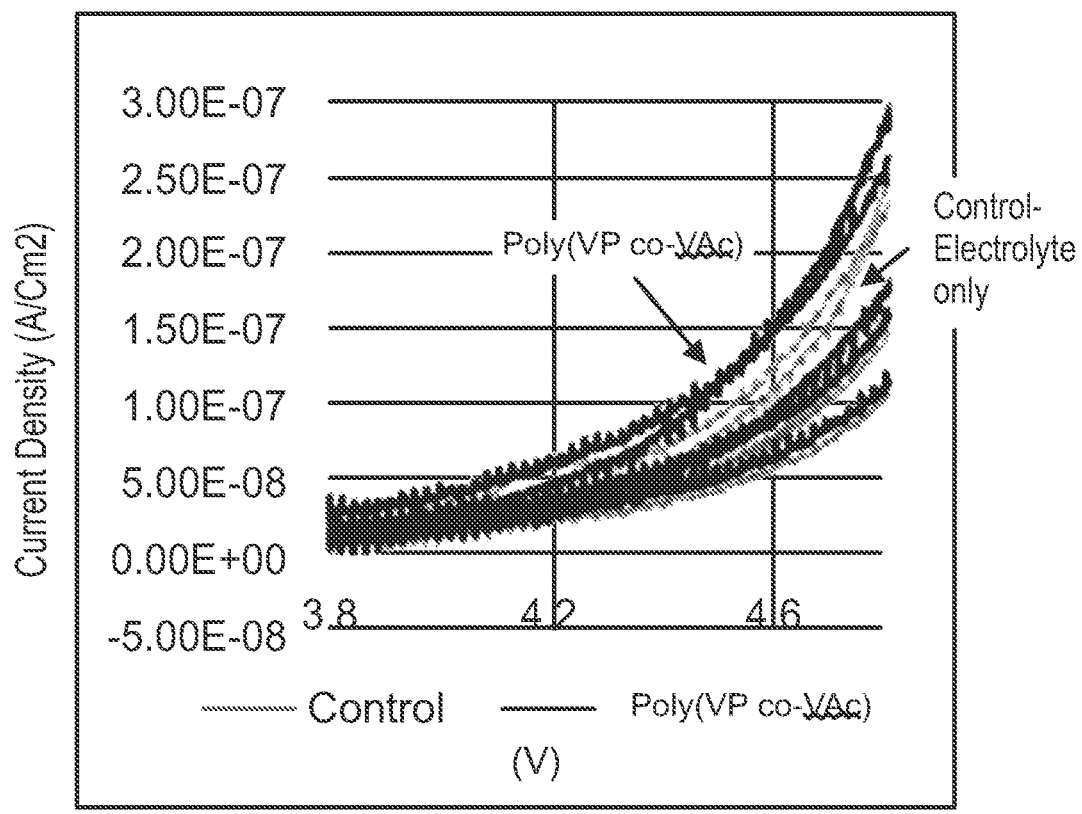
FIG. 1(a) is a cyclic voltammetry test result for poly (vinyl pyrrolidone co-vinyl acetate (Poly (VP-co-VAc)) copolymer after undergoing chemical stability testing in hot (60° C.) electrolyte for 5 days.

In accordance with at least particular embodiments, the preferred inventive composite microporous membrane comprises a coating comprised of a polylactam polymeric binder combined with inorganic particles in an aqueous medium, which is formed on at least one layer and/or surface of a microporous polyolefin separator membrane for use as a battery separator in a lithium battery, such as a lithium ion secondary battery. The inventive polylactam coating may have increased thermal stability at high temperatures due to the highly thermostable cyclic amide chemical structure defined in Chemical Formula 1:

Chemical Formula 1

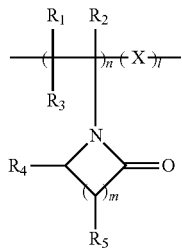

where $R_1$, $R_2$, $R_3$, and $R_4$ may be any alkyl or aromatic substituents and wherein $R_5$ may be any alkyl, aromatic, or fused ring. The preferred polylactam may be a homopolymer or a copolymer, and in the case of a copolymer, the co-polymeric "X" group may be derived from vinyl, alkyl vinyl, vinyl alcohol, vinyl acetate, substituted alkyl vinyl, acrylic acid, alkyl acrylate, acrylonitrile, maleic anhydride, maleic imide, styrene, polyvinylpyrrolidone (PVP), polyvinylvalerolactam, polyvinylcaprolactam (PVCap), polyamide, or polyimide.

In addition, "m" may have a value between 1 and 10, for example, in some cases, 2 to 4. Furthermore, the ratio of "l" to "n" in Chemical Formula 1 may be such that $0 \le l/n \le 10$, and in some cases, $0 \le l/n \le 1$.

Preferred examples of such a polylactam include polyvinylpyrrolidone (PVP) where m=2, shown in Chemical Formula 2(a) on the left just below, and polyvinylcaprolactam (PVCap) where m=4, shown in Chemical Formula 2(b) on the right just below:

Chemical Formula 2

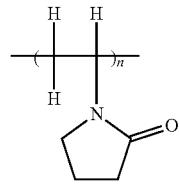

a

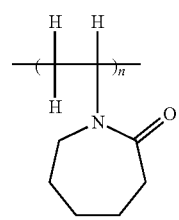

b

Of course, these preferred polylactams can be homopolymers or copolymers, as described above, with various "X" co-polymeric groups, where such "X" co-polymeric groups repeat "1" times.

The performance advantages of a cyclic polylactam are high thermal stability, good chemical stability, and/or reduced entropic penalty. The cyclic ring may include up to 7 elements (such as in the caprolactam ring) but when the total number of elements in the ring structure is ≥8, the polymer may behave acyclic. The chemical structure of a polyvinyl lactam takes advantage of the thermal stability of amide "—N—C=O" functional groups present in cyclic polyaramid and polyimide (PI) structures. A polylactam may have excellent thermal and chemical stability due to the cyclic amide functionality attached to the vinyl backbone. Furthermore, a polyvinyl lactam may avoid the performance limitations of acrylic vinyl polymers which may have marginal chemical and thermal stability due to their tendency to unzip down the vinyl backbone of the polymer as they degrade.

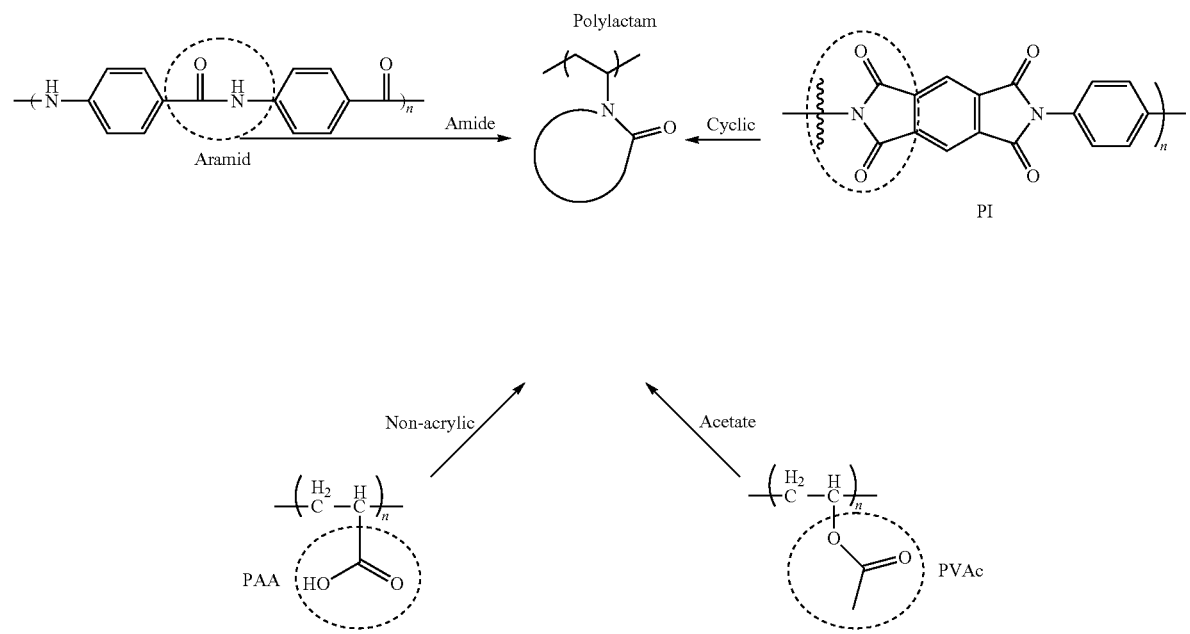

A polylactam may mimic the acyclic structural arrangement of carbon, hydrogen and oxygen atoms in PVAc, but a polylactam is a cyclic amide polymer. For example, the polylactam polyvinylpyrrolidone (PVP) may mimic the chemical structural arrangement of polyvinyl acetate (PVAc) shown in the following drawing where a portion of each polymer is outlined by a hand-drawn curvy line:

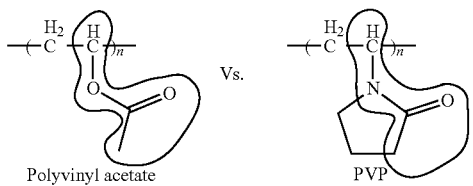
Polyvinyl acetate   Vs.   PVP

The outlined portions in each polymer may be superimposable because of their similar structural bond angles. The improvement of PVP over PVAc in thermal stability may be due to the cyclic amide containing ring characteristic of a polylactam which may account for the high temperature stability of polylactams.

Non-limiting examples of copolymers of polylactam may be poly (vinyl pyrrolidone co-vinyl acetate) (Poly(VP-co-VAc), shown in Chemical Formula 3 below:

Chemical Formula 3

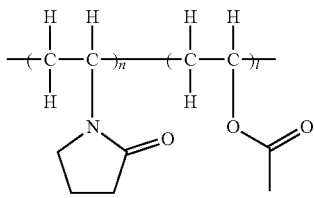

Poly (vinyl pyrrolidone co-vinylcaprolactam) (Poly (VP co-VCap), shown in Chemical Formula 4 below:

Chemical Formula 4

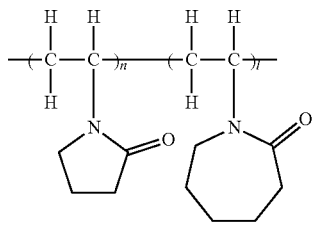

and acrylidone polymer, shown in Chemical Formula 5 below:

Chemical Formula 5

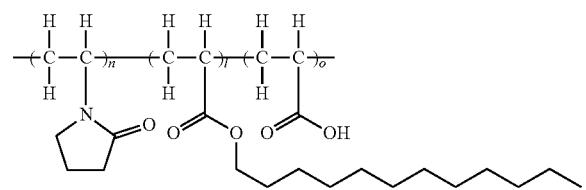

Figure 1B:
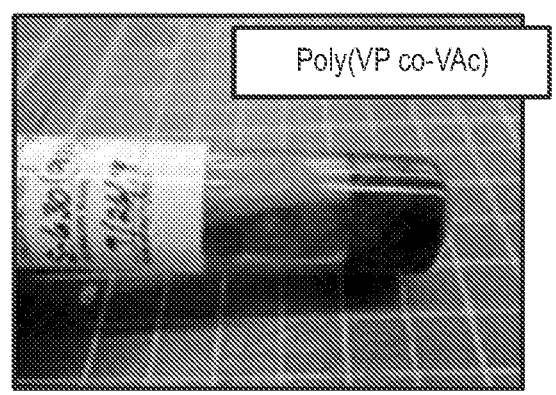
FIG. 1(b) is a photograph of poly (vinyl pyrrolidone co-vinyl acetate (Poly (VP-co-VAc)) copolymer after a chemical stability test in hot (60° C.) electrolyte for 5 days.
Figure 2A:
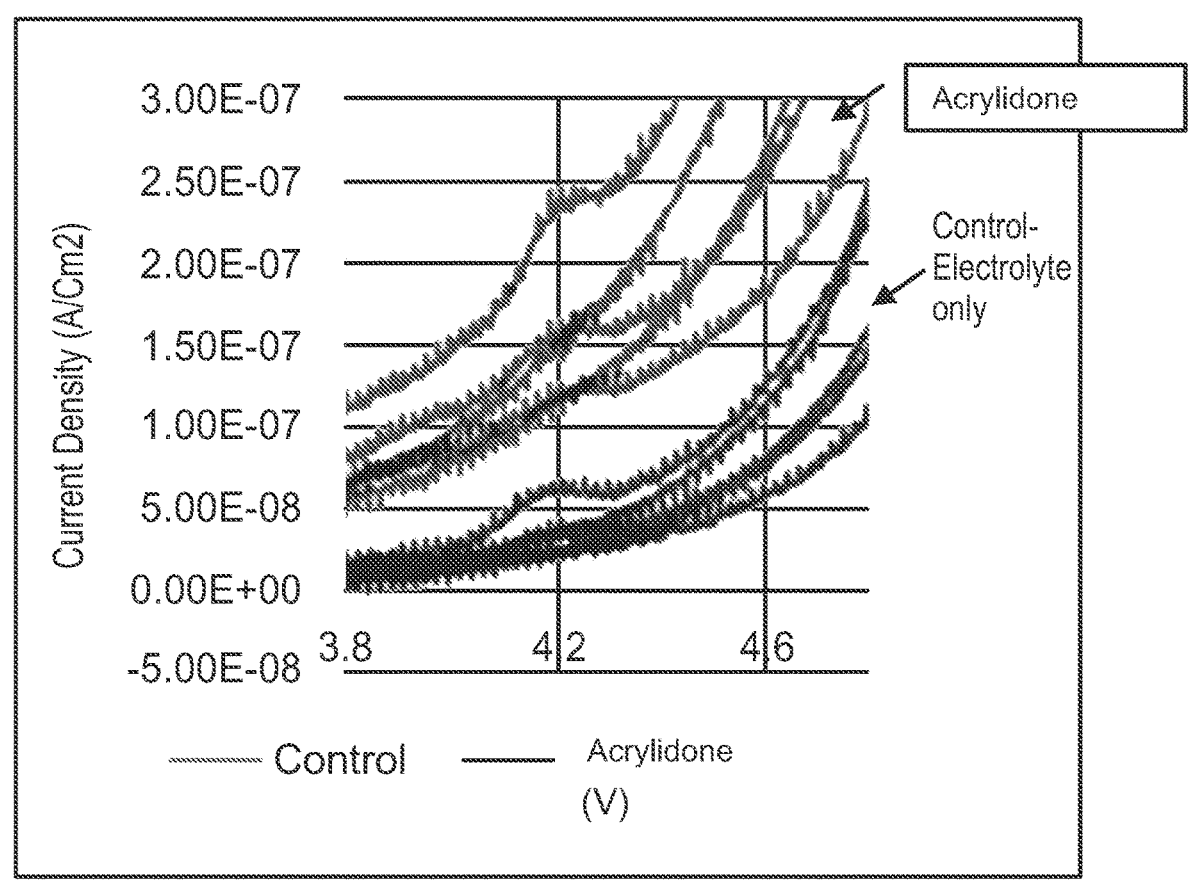
FIG. 2(a) is a cyclic voltammetry test result for a polyacrylidone polymer after undergoing chemical stability testing in hot (60° C.) electrolyte for 5 days.

Non-limiting examples of copolymers of polyvinylpyrrolidone, specifically poly (vinyl pyrrolidone co-vinyl acetate) and acrylidone, were tested for chemical stability in a hot EC:EMC non-aqueous electrolyte at 60 degrees C. for five days. The chemical stability results for Poly (VP co-VAc) and acrylidone are shown in FIGS. 1($b$) and 2($b$), respectively, and can be compared to chemical stability test results on homopolymer PVP shown in FIG. 3($b$). The specific polylactam copolymers in FIGS. 1 and 2 showed some discoloration in the EC:EMC non-aqueous electrolyte at 60° C. for 5 days, while the homopolymer PVP showed no discoloration. However, with varying ratios of the "X" co-polymeric group to the vinyl pyrrolidone unit, with varying molecular weights of the PVP and/or the copolymer, and with other variations, such discoloration might not occur.

In addition, cyclic voltammetry testing was performed on chemical stability tested samples of Poly (VP co-VAc), acrylidone, and PVP, and the results are shown in FIGS. 1($a$), 2($a$) and 3($a$), respectively. Both Poly (VP co-VAc) and acrylidone were found to be less stable than the homopolymer PVP indicating that the Poly (VP co-VAc) and/or the acrylidone may undergo one or more oxidation reactions that produce one or more electroconductive species causing the current level to increase at high voltage. However, as stated above, with varying ratios of the "X" co-polymeric group to the vinyl pyrrolidone unit, with varying molecular weights of the PVP and/or the copolymer, and with other variations, such oxidation reactions may not occur, and results may be closer to those depicted in FIG. 3($a$).

Figure 4:
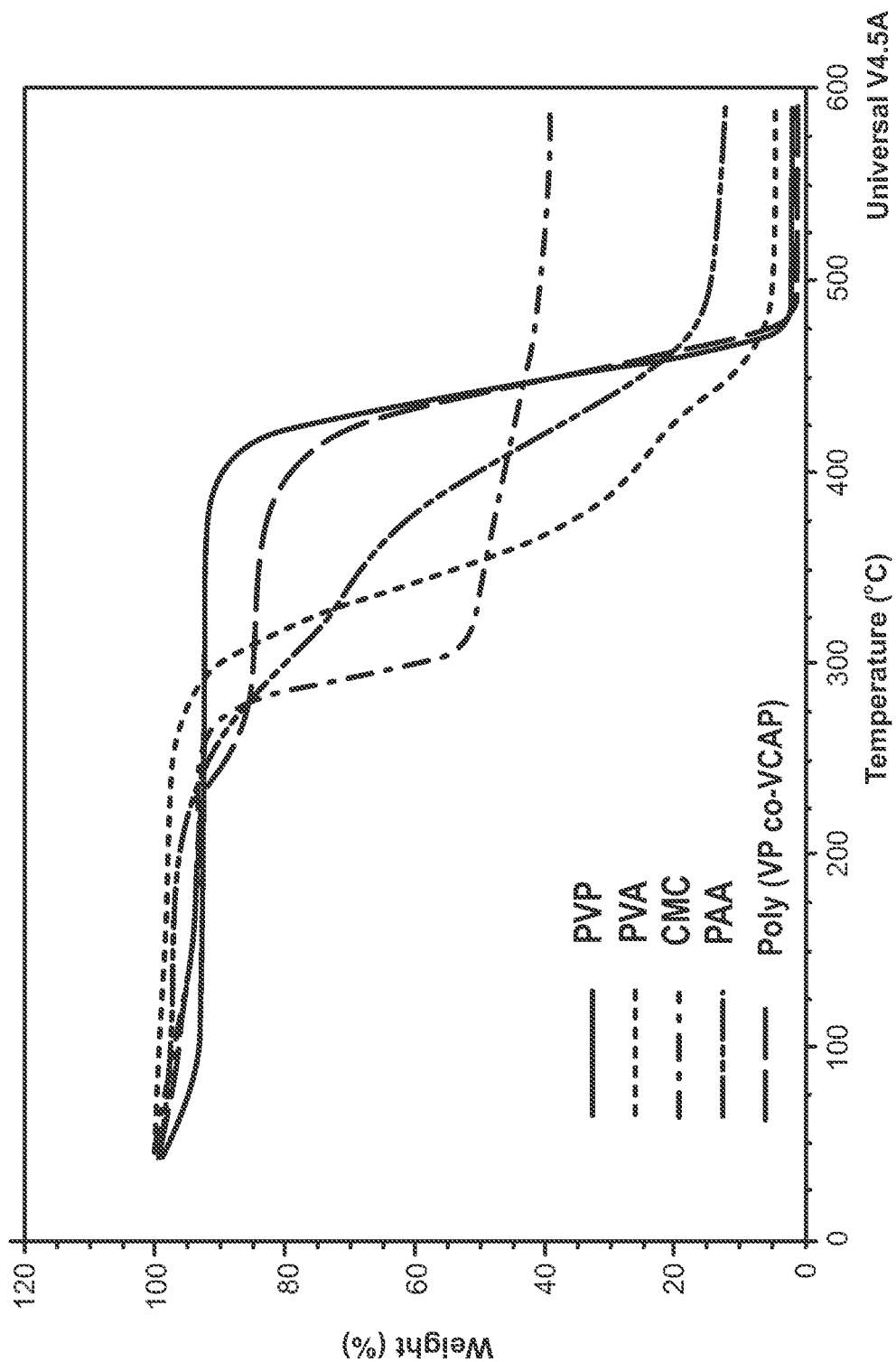
FIG. 4 is a thermal gravimetric analysis (TGA) thermogram of selected polymeric binders.

PVP is a highly thermally stable polymer which has thermal decomposition (Ta) of greater than 400° C. and a glass transition temperature of ≥170° C. FIG. 4 is a Thermal Gravimetric Analysis (TGA) thermogram comparing the temperature of decomposition (Ta) of polyvinylpyrrolidone (PVP) to other polymeric binders known in the prior art as polymeric binders for coatings for battery separator membranes, such as polyvinyl alcohol (PVA), polyacrylic acid (PAA) and carboxymethyl cellulose (CMC). The order of temperature of decomposition is PVP>PVA>CMC>PAA indicating the higher thermal stability of polylactams when compared to PVA, CMC and PAA. In addition, the temperature of decomposition of the copolymer poly (vinyl pyrrolidone co-vinylcaprolactam) (Poly (VP co-VCap) shown in the TMA thermogram in FIG. 4, is lower than that of the homopolymer PVP. The initial small decrease in weight of the PVP homopolymer below 100 degrees C. may be due to the evaporation of water or moisture present in the polyvinylpyrrolidone polymer.

Figure 5:
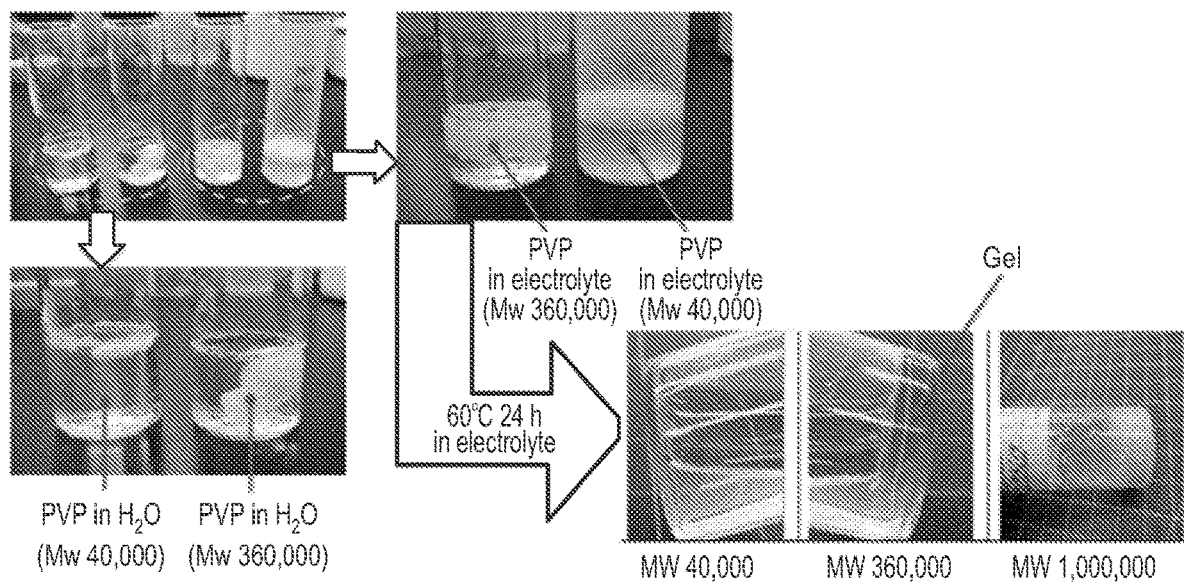
FIG. 5 includes photographs of PVP polymers with molecular weights of 40,000, 360,000 and 1,000,000 in aqueous and electrolyte media, depicting various rates of dissolution as well as gel performance.

A further distinctive feature of a polylactam may be its tendency to associate with water due to its ability to act as an H-bond acceptor. Most cyclic polyaramid polymers may be water insoluble and may require the use of organic solvents such as N-Methylpyrrolidone (NMP) for dissolution. The solubility of the polylactam PVP may be dependent on its molecular weight. For example, the higher the molecular weight of PVP, the lower the rate of solubility of the PVP polymer in water. FIG. 5 presents photographs of PVP polymer with molecular weights of 40,000, 360,000 and 1,000,000 in various electrolyte media and aqueous media. PVP polymers with molecular weights of 40,000, 360,000 and 1,000,000 may dissolve in water, however the lower molecular weight PVP may dissolve faster. In addition, the PVP with a molecular weight of 360,000 may form a gel when placed in a typical lithium ion battery electrolyte at 60 degrees C. for 24 hours while PVP with a molecular weight of ≥1,000,000 may form a solid when placed in a typical lithium ion battery electrolyte at 60 degrees C. for 24 hours.

Figure 6:
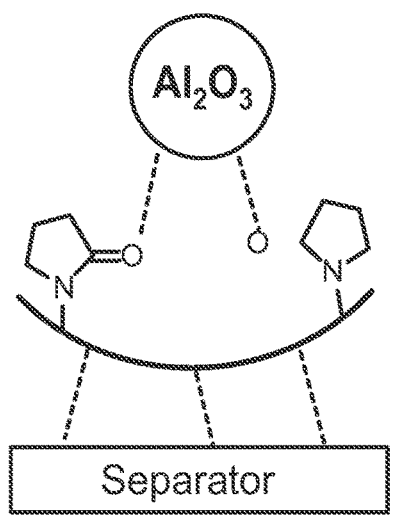
FIG. 6 depicts a proposed mechanism for the improved adhesion of $Al_2O_3$ ceramic particles by a PVP coating on a separator membrane.

The inventive coating may be comprised of a polylactam polymer or a polylactam copolymer combined with inorganic particles in an aqueous medium formed on at least one layer and/or surface of a microporous polyolefin separator membrane for use as a battery separator in a lithium ion secondary battery. In the inventive coating system, the polylactam polymer or a polylactam copolymer may act as the binder polymer which may act to adhere ceramic particles together and may act to adhere the coating to the base separator membrane and/or to the electrode(s) in a lithium ion battery. FIG. 6 proposes a mechanism for the improved adhesion of aluminum oxide ($Al_2O_3$) ceramic particles by one polylactam polymer coating, a PVP coating, on a microporous separator membrane. The PVP polymer has dual functions or is bi-functional. Specifically, two PVP functional groups, the more hydrophilic functional groups of the polymeric coating, may interact with the ceramic particles and may act to anchor an $Al_2O_3$ molecule to the coated microporous separator membrane, while the polyolefin-type chain portion of the PVP polymer coating (the portion that is less hydrophilic) interacts well with the polyolefin microporous separator membrane, providing excellent binding and a chemical bonding of the PVP to the $Al_2O_3$ ceramic particle component contained in the coating mixture. The result is a polymeric binder coating containing $Al_2O_3$ ceramic particles that may not flake off the coated separator membrane during handling, battery assembly, and/or during the repeated cycling/life/use of the battery.

The particles used herein to make a coating may be organic and/or inorganic, preferably inorganic, and in many embodiments, ceramic particles. Non-limiting examples of inorganic ceramic particles may include silicon oxide ($SiO_2$), aluminum oxide ($Al_2O_3$), boehmite (Al(O)OH), zirconium oxide, titanium dioxide ($TiO_2$), barium sulfate ($BaSO_4$), and oxides of transition metals and the like or mixtures thereof. The preferred inorganic ceramic particle may be aluminum oxide. The particles may have an average particle size ranging from 0.05 to 5 µm in diameter, more preferably 0.02 to 4 µm in diameter, and most preferably 0.01 to 2 µm in diameter. For example, the inventive coating may be comprised of a polylactam polymer or a polylactam copolymer combined with inorganic particles, organic particles, both, mixtures of each, or without any particles, in an aqueous medium formed on at least one layer and/or surface of a microporous polyolefin separator membrane for use as a coated battery separator membrane or layer in a lithium ion secondary battery separator or battery.

The inventive coating containing a polylactam polymer or a polylactam copolymer may provide improved thermal stability at high temperatures when applied to a microporous polyolefin separator membrane for use as a battery separator due to its highly thermostable cyclic amide-type structure. Thermal properties of the uncoated polyolefin membrane may be dependent on the type of polyolefin, where polypropylene typically melts around 165° C. and polyethylene typically melts around 135° C. The melting temperature of the polylactam is higher than the melt temperature of PP and/or PE, and when the polylactam is used to coat a microporous polyolefin separator membrane, the polylactam coating may reduce the thermal shrinkage of the coated microporous separator membrane.

Figure 7:
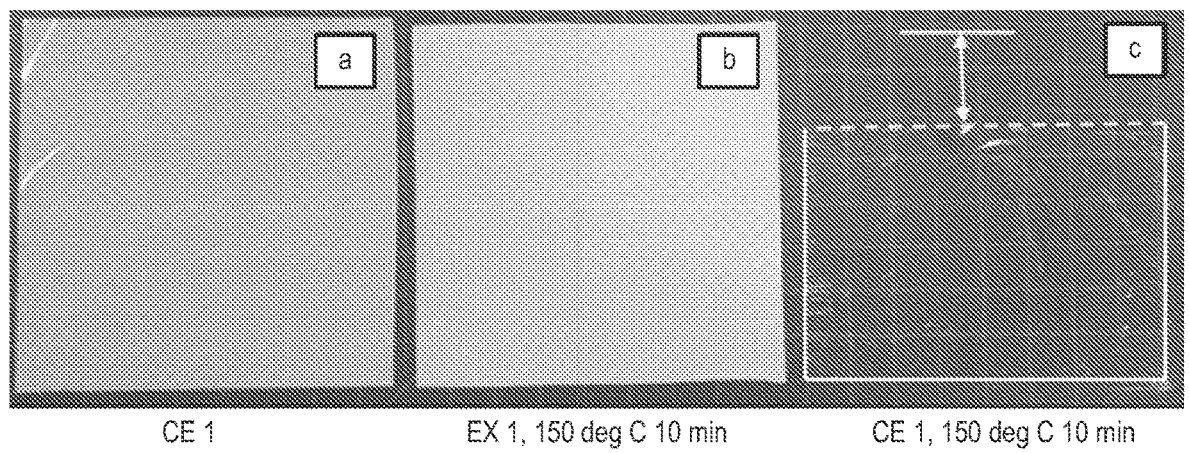
FIG. 7 includes: (a) a photograph of CE1, an uncoated PP/PE/PP trilayer microporous separator membrane; (b) a photograph of a sample of Example 1, a PVP/$Al_2O_3$ coated PP/PE/PP trilayer microporous separator membrane that has been thermal shrinkage tested after being placed in an oven at 150° C. for 10 minutes; and (c) a photograph of CE1, an uncoated PP/PE/PP trilayer microporous separator membrane after being placed in an oven at 150° C. for 10 minutes.

FIG. 7(b) is a photograph of a polyvinylpyrrolidone (PVP)-ceramic coated separator membrane, specifically a polyvinylpyrrolidone and aluminum oxide (PVP-$Al_2O_3$) coated PP/PE/PP trilayer microporous separator membrane that has been thermal shrinkage tested by being placed in an oven at 150° C. for 10 minutes. FIG. 7(a) is a photograph of the uncoated CE1 base membrane (the PP/PE/PP trilayer microporous separator base membrane) before being placed in an oven at 150° C. for 10 minutes. FIG. 7(c) is a photograph of the uncoated CE1 base membrane after being placed in an oven at 150° C. for 10 minutes.

The solid lines in FIG. 7(c) represent the original dimensions of the test sample, while the horizontal dotted line indicates the edge of the sample after shrinkage. Percent thermal shrinkage is measured in the Machine direction (MD) and can be expressed as a % MD shrinkage. The PVP-$Al_2O_3$ coated PP/PE/PP trilayer microporous separator membrane shown in FIG. 7(b) has a 3% percent machine direction (MD) thermal shrinkage, which may be considered a very low value. In contrast, an uncoated PP/PE/PP trilayer microporous separator membrane, shown in FIG. 7(a) before oven treatment, has much higher shrinkage after being placed in an oven at 150° C. for 10 minutes, as shown in FIG. 7(c). Lower thermal shrinkage of a microporous separator membrane may be a critical separator membrane performance property because decreased machine direction and transverse direction dimensional shrinkage may reduce the chance of physical contact between cathode and anode during repeated battery cycling, which may result in an improved temperature related safety performance when used as a separator membrane in a rechargeable lithium ion battery.

The inventive polylactam ceramic based coating may include one or more additives to improve the wetting property of the ceramic coating slurry onto a polyolefin microporous separator membrane as well as the wettability of the overall coated separator, where the base membrane may include, but is not limited to, polypropylene (PP) and/or polyethylene (PE). Such polyolefin microporous separator membranes are available from Celgard, LLC of Charlotte, North Carolina. The microporous base membranes can be manufactured by, for example, a dry stretch process (known as the Celgard® dry stretch process) of Celgard, LLC of Charlotte, North Carolina, or by a wet process, sometimes known as a phase separation or extraction process of Celgard Korea, Limited of South Korea, Asahi Kasei of Japan and/or Tonen of Japan, or it can be a nonwoven type membrane. The base membrane may be a single layer (one or more plies) of polypropylene and/or polyethylene, or a multi-layer membrane, such as a trilayer membrane, e.g., polypropylene/polyethylene/polypropylene (PP/PE/PP) or polyethylene/polypropylene/polyethylene (PE/PP/PE), bilayer membrane (PP/PE, PE/PP, PE/PE, PP/PP), or the like.

Certain isotactic polypropylenes have a surface energy of 30.1 mN/m at 20° C., which is lower than the surface energy of certain linear polyethylenes, of 35.7 mN/m. In order to completely and rapidly wet the base PP and/or PE microporous separator membrane during the coating process, a coating slurry should have a surface energy similar to the base PP and/or PE microporous separator membrane. The inventive polylactam ceramic based coating may include one or more additives to allow for rapid wetting by the ceramic slurry coating on a polypropylene, polyethylene, PP/PE/PP, or the like, microporous separator, and such additive may also help improve the overall wettability of the final coated separator when in use in a battery in electrolyte.

The inventive coating may use polyvinyl alcohol (PVA) as an additive component in order to achieve rapid wetting of the PVP polymer-ceramic slurry onto a PP microporous separator membrane or onto the PP surface of the PP/PE/PP trilayer microporous separator membrane, as well as to achieve improved wettability for the final coated separator inside a battery filled with electrolyte. For purposes of this discussion, PP microporous separator membrane will be understood to mean both a PP microporous membrane, a PP/PE/PP microporous trilayer membrane or a multilayer PP and PE-containing microporous membrane. It has been found that the amount of the PVA additive component may be critical. Too little of the PVA additive component, and the PP microporous separator membrane may fail to wet or may not have enhanced wettability in electrolyte in a battery. Furthermore, a low amount of PVA additive component in the PVP coating may lead to a higher thermal shrinkage of the PVP ceramic coated PP microporous separator. In contrast, amounts of PVA in the PVP coating which are higher than the optimal range, may lead to the discoloration of the coated PP microporous separator membrane in typical non-aqueous electrolyte(s) used in lithium ion batteries. In addition, higher amounts of PVA in the PVP coating may lead to gas generation as well as lower oxidation stability at higher voltage as measured by cyclic voltammetry (CV). PVP binder has been found to have good oxidation stability in an electrolyte with less electrolyte discoloration, and furthermore, it has been found that wetting additives, such as PVA, may enable the PVP-ceramic coating to have a high rate of wetting onto a PP base microporous membrane and may improve the overall wettability of the final coated separator. In some instances, the ratio of PVP:PVA in a polymeric ceramic coating may be 10:0.1 to 10:10.

Examples

The inventive lactam based polymer ceramic coating may have high temperature stability and improved resistance to thermal shrinkage without adversely affecting battery separator performance properties such as Gurley, wetting (or wettability) and electrolyte stability. Gurley (JIS P 8117) is defined as the time in seconds required for 100 cc of air to pass through one square inch of a porous material at a constant pressure of 4.8 inches of water. Wetting performance is determined by placing one drop of an electrolyte on the surface of a porous membrane and measuring the time to wet. Electrolyte stability of a polymer is measured by placing a sample in an electrolyte such as, but not limited to, EC:EMC with 1 Molar $LiPF_6$, heating the sample to 60 degrees C. and observing any change in color. A subsequent columbic and/or cyclic voltammetry measurement on the stability tested sample will indicate if the polymer sample undergoes an oxidation reaction that may produce one or more electroconductive species, thereby causing current level to increase.

Extensive studies have been performed in the development of the inventive membrane and have determined the preferred formulation composition in terms of homopolymer and/or copolymer content, the preferred ratio of polylactam to ceramic particles, and the preferred method to enhance the wettability of the polylactam based ceramic coating slurries on polyolefin separator membranes and ultimately enhance the wettability of the coated separator when used in electrolyte inside a battery such as a secondary lithium ion battery.

The effect of polyvinyl alcohol (PVA) as an additive component in the PVP-ceramic coating, on separator properties such as Gurley, wetting, electrolyte stability and resistance to thermal shrinkage, is demonstrated in the examples set forth in Tables 1 and 2 below, where the PVP:PVA ratio is varied, where certain copolymers of PVP are used (see for example, Examples 7 and 8), and where certain variances are made in the amount of ceramic particles in the coating.

TABLE 1

| | Ratio of Binders | | | | | | | | |
|---|---|---|---|---|---|---|---|---|---|
| | Poly (VP) | Poly (VP-co-Vcap) | Poly (VP-co-VAc) | PVA | PEO | CMC | $Al_2O_3$:Binder | Solid content (%) | Viscosity (cP) |
| Ex. 1 | 1 | — | — | 0.1 | — | — | 95:5 | 45 | ~ |
| Ex. 2 | 1 | — | — | 0.1 | — | — | 97:3 | 40 | ~ |
| Ex. 3 | 1 | — | — | 0.2 | — | — | 97:3 | 40 | 40 |
| Ex. 4 | 1 | — | — | 0.2 | — | — | 95:5 | 40 | 45 |
| Ex. 5 | 1 | — | — | 0.5 | — | — | 97:3 | 40 | 40 |
| Ex. 6 | 1 | — | — | 0.1 | — | — | 90:10 | 33 | 60 |
| Ex. 7 | — | 1 | — | 0.1 | — | — | 95:5 | 45 | 75 |
| Ex. 8 | — | — | 1 | 0.1 | — | — | 95:5 | 45 | 60 |
| Ex. 9 | 1 | — | — | 0 | — | — | 97:3 | 40 | 35 |
| Ex. 10 | 1 | — | — | 0.01 | — | — | 95:5 | 45 | 58 |
| Ex. 11 | 1 | — | — | 1 | — | — | 97:3 | 40 | 40 |
| Ex. 12 | 1 | — | — | 0.1 | — | — | 95:5 | 45 | ~ |
| CE 1 | — | — | — | — | — | — | — | — | — |
| CE 2 | — | — | — | — | — | 1 | 98:2 | 40 | 80 |
| CE 3 | — | — | — | 1 | — | — | 97:3 | 40 | 45 |
| CE 4 | — | — | — | — | 1 | — | 97:3 | 40 | 30 |
| CE 5 | — | — | — | — | — | — | — | — | — |

TABLE 2

| | Total thickness/Coating layer thickness (□m) | Gurley (sec/100 cc) | Wetting | Electrolyte stability (60° C., 5 days) | Loading coating layer (g/m²) | Thermal Shrinkage MD/TD (%) (150° C., 10 min) |
|---|---|---|---|---|---|---|
| Ex. 1 | 20/4 | 495 | ○ | ○ | 6 | 3/2 |
| Ex. 2 | 20/4 | 500 | ○ | ○ | 5.5 | 7/2 |
| Ex. 3 | 20/4 | 500 | ○ | ○ | 5 | 7/2 |
| Ex. 4 | 20/4 | 505 | ○ | ○ | 5.5 | 5/2 |
| Ex. 5 | 20/4 | 650 | ○ | Δ | 5 | 7/2 |
| Ex. 6 | 18/2 | 1039 | ○ | ○ | 5 | 9/2 |
| Ex. 7 | 20/4 | 504 | ○ | Δ | 6 | 7/2 |
| Ex. 8 | 20/4 | 510 | ○ | X | 6 | 15/2 |
| Ex. 9 | 20/4 | 450 | X | ○ | 5 | 25/3 |

TABLE 2-continued

| | Total thickness/ Coating layer thickness (□m) | Gurley (sec/ 100 cc) | Wetting | Electrolyte of stability (60° C., 5 days) | Loading coating layer (g/m²) | Thermal Shrinkage MD/TD (%) (150° C., 10 min) |
|---|---|---|---|---|---|---|
| Ex. 10 | 20/4 | 490 | Δ | ○ | 6 | 15/3 |
| Ex. 11 | 20/4 | 720 | ○ | Δ | 5.5 | 6/2 |
| Ex. 12 | 14/4 | 336 | ○ | ○ | 6 | 3/2 |
| CE 1 | 16/0 | 442 | — | ○ | — | 27/3 |
| CE 2 | 20/4 | 450 | Δ | Δ | 5 | 10/3 |
| CE 3 | 20/4 | 500 | ○ | X | 5 | 7/2 |
| CE 4 | 20/4 | 455 | X | ○ | 5 | 27/3 |
| CE 5 | 14/0 | 308 | — | ○ | — | >20/3 | where:
○ = excellent
Δ = marginal
X = poor or unacceptable

Gurley remained fairly unchanged at 450-500 sec/100 cc for PVP:PVA ratios such as 1:0.1, 1:0.2, 1:0.01, and 1:0 (see Examples 1-4, and 9-10) but increased about 30% at a PVP:PVA ratio of 1:0.5 (see Example 5) and increased about 44% at PVP:PVA ratio of 1:1 (see Example 11). A comparison of the 442 sec/100 cc Gurley for uncoated base separator membrane CE1 to Ex. 4, which is a PVP:PVA ratio=1:0.2 demonstrates that the PVP:PVA ratio in the ceramic coating at levels where PVA additive≤0.2 (compared with 1 part PVP) does not adversely affect the Gurley.

Excellent wetting of the membrane is observed at PVP:PVA ratios of 1:0.1, 1:0.2, 1:0.5, and so forth, demonstrating the improvement in wetting is achieved by the addition of a small quantity of a hydrophilic additive.

Electrolyte stability was good at PVP:PVA ratios of 1:0, 1:0.01, 1:0.1, and 1:0.2 but only marginally acceptable at PVP:PVA ratios such as 1:0.5 and 1:1, indicating that too high an amount of PVA may result in undesirable oxidation of the coated sample in the electrolyte.

Thermal shrinkage at 150° C. for ten minutes was observed to be 25% in the machine direction (MD) and 3% in the transverse direction (TD) when no PVA additive component was present (see Example 9). A significant reduction in thermal shrinkage was achieved with the addition of the PVA additive as shown for various inventive examples such as in Examples 1-8 and 10-12 (see, for instance, Example 1 in which MD shrinkage was reduced to 3% and TD shrinkage was reduced to 2%).

A ratio of PVP:PVA of 1:0.1 was found to be in a preferred PVP:PVA formulation ratio range where oxidation and color change were not observed in electrolyte stability testing.

The effect of the amount of aluminum oxide ($Al_2O_3$) in the ratio of PVP to $Al_2O_3$ on separator properties of Gurley, wetting, electrolyte stability and resistance to thermal shrinkage is demonstrated in the examples set forth in Tables 1 and 2 where the PVP:$Al_2O_3$ ratios are varied in different amounts.

The effect of copolymer poly (vinyl pyrrolidone-vinyl acetate) (Poly (VP co-VAc)) and the copolymer poly (vinyl pyrrolidone-vinylcaprolactam) (Poly (VP co-VCap) on separator properties of Gurley, wetting, electrolyte stability and resistance to thermal shrinkage is demonstrated in Ex. 8 where the copolymer poly (VP-co-VAc) is used in a copolymer:PVA ratio of 1:0.1 (PVA being the additive to help improve separator wettability) and in Ex. 7 where the copolymer poly (VP-co-VCap) is used in a copolymer:PVA ratio of 1:0.1. For comparison, Ex. 1 provides an example of the PVP homopolymer with no copolymer component, at the same polymer:PVA ratio of 1:0.1 and at the same ceramic:binder ratio of 95:5.

The Gurleys of both copolymer examples, Ex. 7 and Ex. 8, are 504 and 510 sec/100 cc respectively, indicating good permeability.

Excellent wetting of Ex. 7 and Ex. 8 coated polyolefin microporous membranes is observed as would be expected due to the hydrophilic nature of the copolymers.

Figure 2B:
FIG. 2(b) is a photograph of polyacrylidone polymer (a terpolymer of vinyl pyrrolidone, acrylic acid, and lauryl methacrylate) after a chemical stability test in hot (60° C.) electrolyte for 5 days.
Figure 3A:
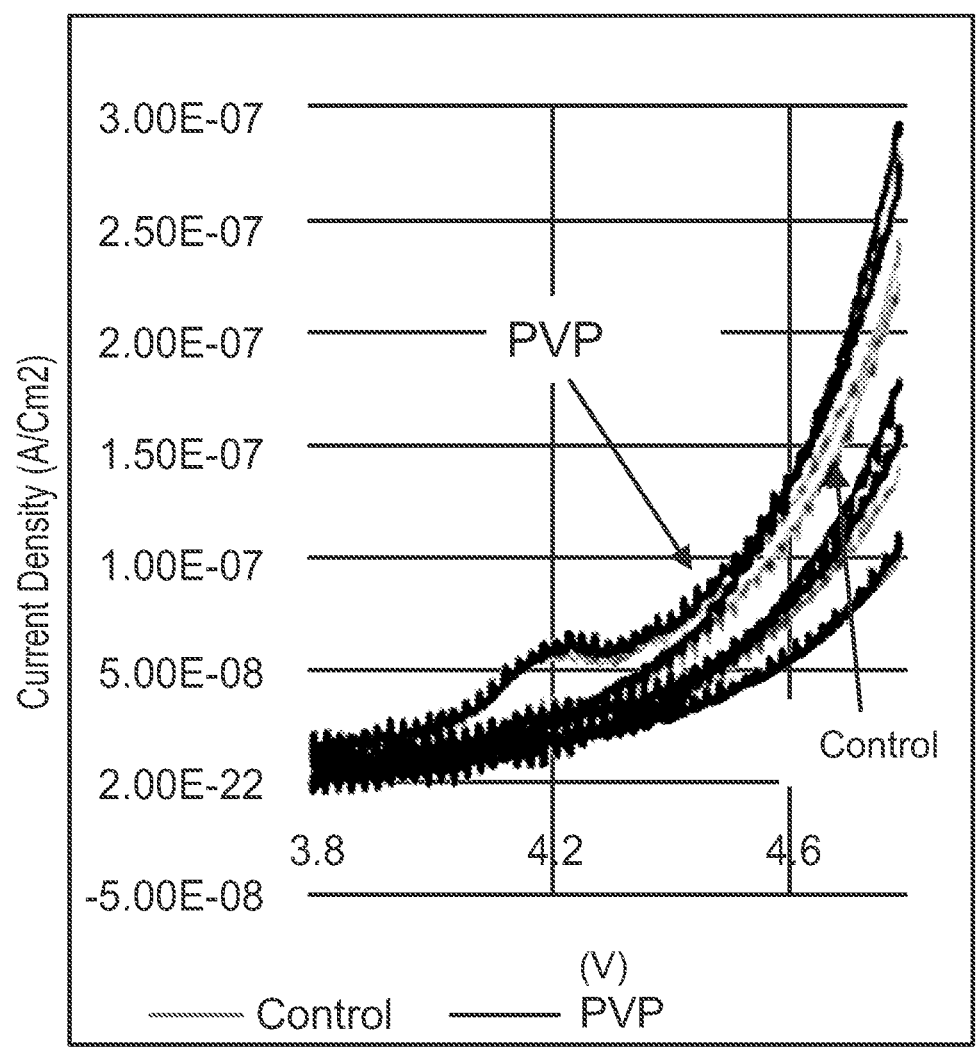
FIG. 3(a) is a cyclic voltammetry test result for polyvinylpyrrolidone (PVP) polymer after undergoing chemical stability testing in hot (60° C.) electrolyte for 5 days.
Figure 3B:
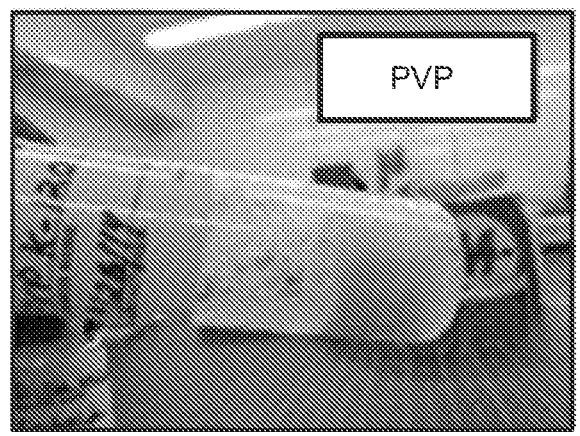
FIG. 3(b) is a photograph of polyvinylpyrrolidone (PVP) polymer after a chemical stability test in hot (60° C.) electrolyte for 5 days.

Electrolyte stability of Ex. 7 poly (vinyl pyrrolidone-vinylcaprolactam) is marginal while electrolyte stability of Ex. 8 poly (vinyl pyrrolidone-vinyl acetate) is unacceptable or poor. Results of exposure of selected homopolymer binders and copolymer binders to electrolyte at 60 degrees C. during stability testing are shown in FIGS. 1(b), 2(b) and 3(b). FIG. 3(b) shows PVP homopolymer remains colorless or substantially colorless while poly (VP co-VAc) shown in FIG. 1(b) changes color and darkens. Columbic and/or cyclic voltammetry (CV) oxidative analysis data on Poly (VP co-VAc) shown in FIG. 1(a) demonstrates Poly (VP co-VAc) is less stable than PVP, indicating that the Poly (VP co-VAc) may undergo an oxidation reaction that produces an electroconductive species causing the current level to increase at high voltage. However, as discussed above, with varying ratios of the "X" co-polymeric group to the vinyl pyrrolidone unit, with varying molecular weights of the PVP and/or the copolymer, and with other variations, such discoloration might not occur and can be controlled or decreased.

Thermal shrinkage at 150° C. for ten minutes of Ex. 7 and Ex. 8 was higher in the MD (but the same in the TD) indicating that Ex. 1 homopolymer PVP coating formulation may be preferred in certain instances in terms of thermal shrinkage reduction.

The effect of different known polymeric binders such as carboxymethyl cellulose (CMC), polyvinyl alcohol (PVA) and polyethylene oxide (PEO) on the separator properties of Gurley, wetting, electrolyte stability and resistance to thermal shrinkage is demonstrated in CE2, CE3 and CE4, respectively.

The Gurleys of CMC, PVA, and PEO are all comparable and are in the range of 450 to 500 sec/100 cc indicating that these binders in combination with ceramic had good permeability and were comparable to, for instance, inventive Example 1.

Ceramic coatings containing the known binders PEO and CMC (see CE4 and CE2) had marginal or poor wetting of the membrane, while the ceramic coatings containing the known binder PVA had good wetting comparable to, for instance, inventive Example 1.

Electrolyte stability of CE4 (with the known binder PEO) was good (and comparable to, for instance, inventive Example 1) while electrolyte stability of CMC and PVA (CE2 and CE3) was marginal or poor or unacceptable.

Figure 8:
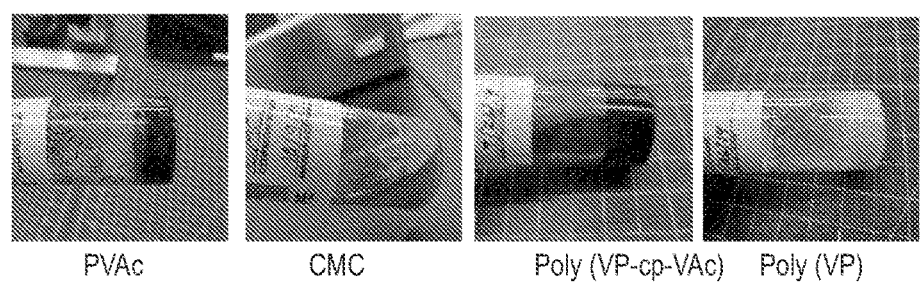
FIG. 8 includes a series of photographs of samples of (a) polyvinyl acetate (PVAc), (b) carboxymethyl cellulose (CMC), (c) poly (vinyl pyrrolidone co-vinyl acetate (poly (VP co-VAc) and (d) polyvinylpyrrolidone (PVP) after electrolyte stability testing in hot (60° C.) electrolyte for 5 days.

Looking in more depth at electrolyte stability, FIG. 8 shows photographs of samples of PVAc, CMC, Poly (VP co-VAc) and PVP after electrolyte stability testing in a hot (60° C.) electrolyte, (here, EC:EMC with 1 Molar $LiPF_6$ electrolyte) for 5 days. Discoloration is observed in all polymeric binders with the exception of PVP, however, it should be noted that the copolymer shown in FIG. 8(c) may be modified so as to decrease such discoloration as described above.

Figure 9B:
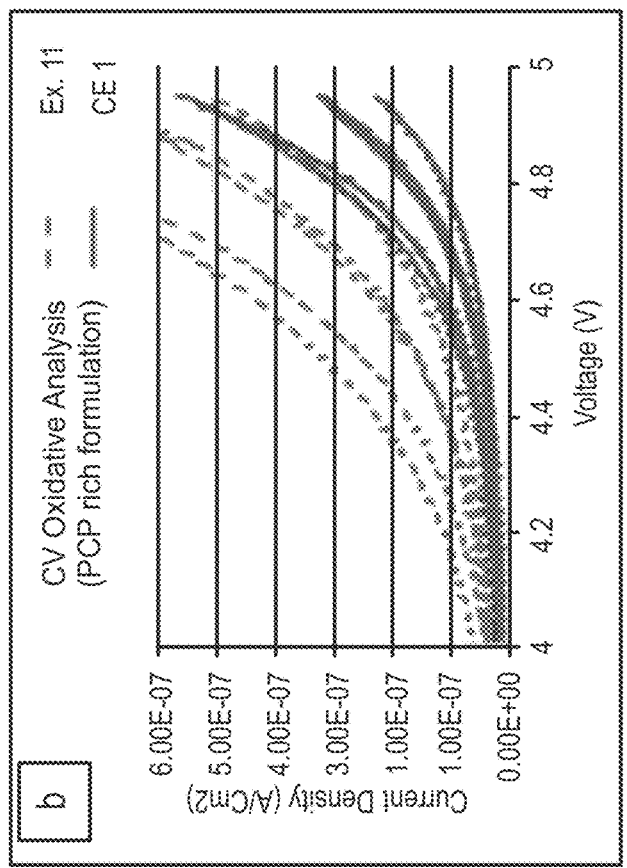
FIGS. 9(a) and 9(b) include respective cyclic voltammetry (CV) test results for Example 1 and CE1 and Example 11 and CE1.
Figure 9A:
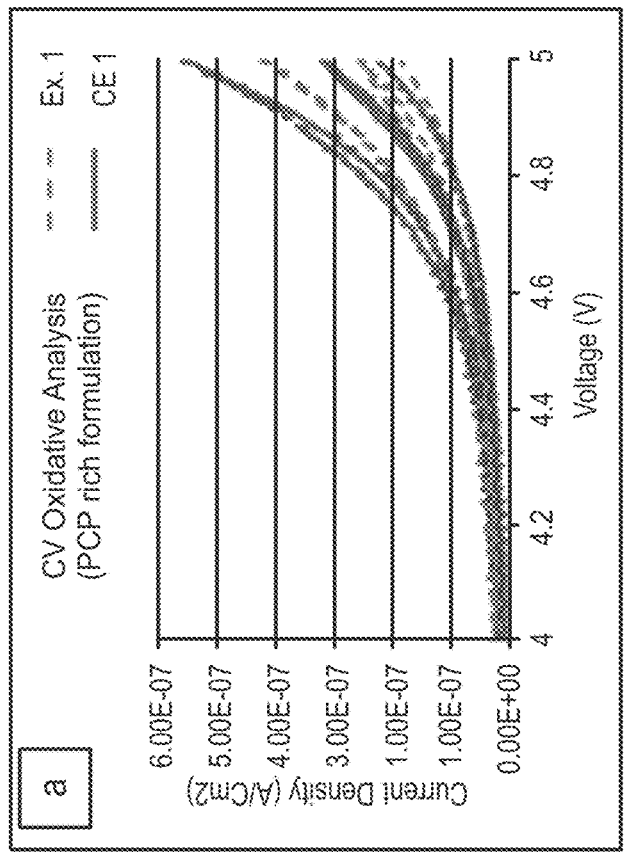

Cyclic voltammetry (CV) plots are included in FIG. 9. In FIG. 9(a), the oxidative analysis of a PVP rich coating formulation for the coated membrane of Example 1 (which coating comprises a PVP homopolymer with a PVP:PVA ratio of 1:0.1) is compared with uncoated base membrane CE1, and both act very similarly in electrolyte. In FIG. 9(b), the oxidative analysis of a PVA rich coating formulation for the coated membrane of Example 11 (which coating comprises a PVP homopolymer with a PVP:PVA ratio of 1:1) is compared with uncoated base membrane CE1. The PVP rich formulation, in this case, outperforms the PVA rich formulation in terms of oxidative stability.

The optimal range of molecular weight of the PVP is in the molecular weight range of 200,000 to 3,500,000, more preferably in the molecular weight range of 300,000 to 3,000,000 and most preferably in the molecular weight range of 300,000 to 2,000,000 g/mol. At a molecular weight less than 100,000, PVP may dissolve in hot (60° C.) electrolyte which may cause poor adhesion of the coating to the base microporous membrane which in turn can have a negative impact on battery performance.

Separator performance properties of two exemplary formulations of PVP:$Al_2O_3$, Ex 1 and Ex. 12, coated onto PP/PE/PP trilayer microporous separator membranes are shown in Table 3.

TABLE 3

| Thickness, μm | CE1 16 | Ex. 1 20 μm total (including 4 μm coating) | CE5 14 | Ex. 12 14 μm + 4 μm coating |
|---|---|---|---|---|
| JIS Gurley, s | 442 | 495 | 308 | 336 |
| Puncture strength, gf | 298 | 310 | 314 | 314 |
| ER, ohm-cm$^2$ | 1.9 | 1.99 | 1.3 | 1.57 |
| Dielectric Breakdown, V | 1900 | 2088 | 1600 | 2021 |
| MD/TD % Shrinkage 130° C./1 hour | <10/2 | 1.4/0.4 | <10/2 | 1.8/0.3 |
| MD/TD % Shrinkage 150° C./10 min. | >20/3 | 3/2 | >20/3 | 3/2 |
| MD/TD % Shrinkage 150° C./1 hour | >20/3 | 5/2 | >20/3 | 5/3 |

CE1 and CE5 are uncoated trilayer PP/PE/PP microporous separator membranes that have a thickness of 16 μm and 14 μm, respectively. The puncture strength of uncoated CE1 and CE5 are 298 and 314 gf, respectively. Coating data provided in Table 3 shows that the puncture strength of 4 μm coated samples Ex. 1 and Ex. 12 remain basically unchanged indicating that the coating may not have an adverse effect on the strength of the separator membrane. There is a significant improvement in the thermal shrinkage of the coated separator examples Ex. 1 and Ex. 12. At 130° C., Ex. 1 and Ex. 12 both showed low % MD/TD thermal shrinkage values of 1.4/0.4 and 1.8/0.3. At a very high thermal shrinkage temperature of 150° C., the % MD/TD thermal shrinkage for 10 minutes is 3/2 for both Ex. 1 and Ex. 12 while the thermal shrinkage at 150° C. for 1 hour for Ex. 1 is 5/2 and for Ex. 12 is 5/3. The % thermal shrinkages values of ≤3% TD shrinkage and ≤5% MD shrinkage may predict that the coated PVP:$Al_2O_3$PP/PE/PP separator membranes may have high thermal stability performance in a lithium ion battery.

Figure 10:
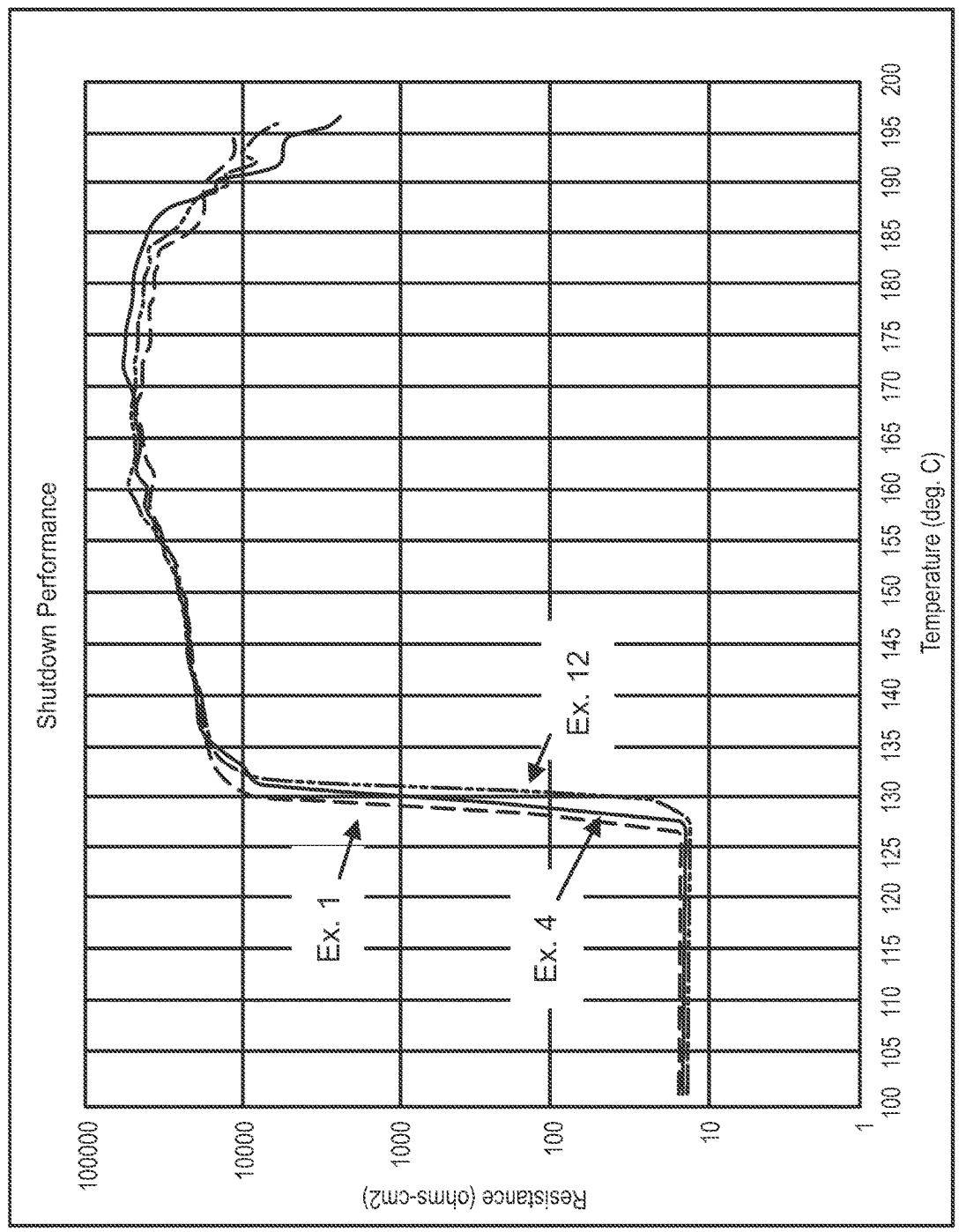
FIG. 10 is a hot electrical resistance plot of Ex. 1, Ex. 4 and Ex. 12, where electrical resistance in ohm-$cm^2$ is plotted as a function of temperature in degrees C.

The high temperature stability of the PVP:$Al_2O_3$ coating is also demonstrated in thermal shutdown Hot Electrical Resistance (Hot ER) test results shown in FIG. 10 where Ex. 1 and Ex. 12 have extended high temperature shutdown up to 190° C. The initiation of shutdown occurs at 135° C. due to the inner polyethylene layer in the PP/PE/PP trilayer base membrane. The PVP:$Al_2O_3$ coated PP/PE/PP has both low temperature shutdown and high temperature extended dimensional stability, which may reduce the chance of physical contact between cathode and anode during repeated battery cycling resulting in improved temperature related safety performance when used as a separator membrane in a rechargeable lithium ion battery.

In addition, the inventive PVP:$Al_2O_3$ coating may not have an adverse effect on the electrical resistance (ER) of the microporous separator membrane. The ER of coated Ex. 1 and Ex. 12 is 1.99 ohm-cm$^2$ and 1.57 ohm-cm$^2$, respectively, which may demonstrate the inventive coating promotes good ionic conductivity.

Figure 11:
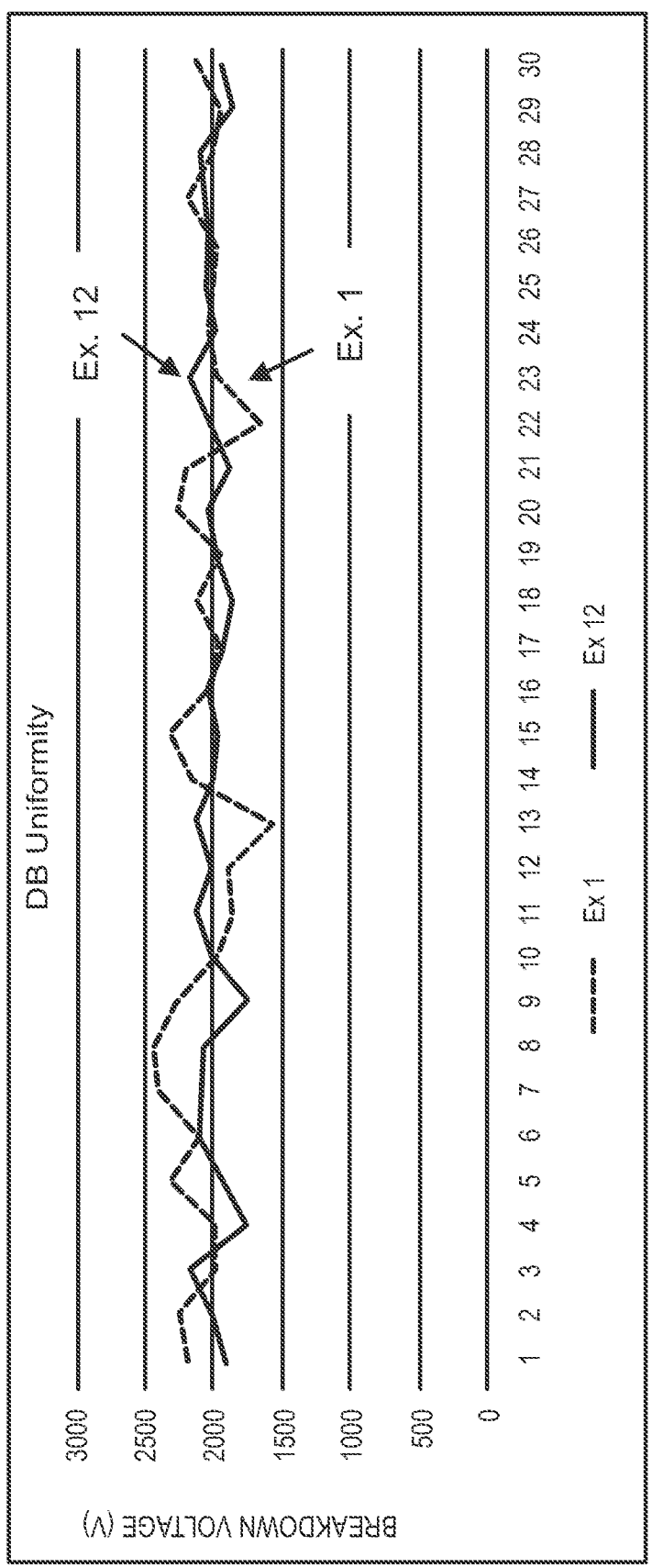
FIG. 11 includes dielectric breakdown data for Ex. 1 and Ex. 12.

In addition, the inventive PVP:$Al_2O_3$ coating may not have an adverse effect on the Dielectric Breakdown (DB), which is also known as the HiPot test, of the microporous separator membrane. The DB values increase when compared to the uncoated separator membranes CE1 and CE5, demonstrating that the force required to cause a short circuit in a lithium battery may be higher. FIG. 11 shows the DB results on lab coated samples of Ex. 1 and Ex. 12 where the DB values are approximately 2000 V. The inventive coating shows an improved high dielectric breakdown indicating that the strength of the separator membrane was improved by the coating.

Figure 12:
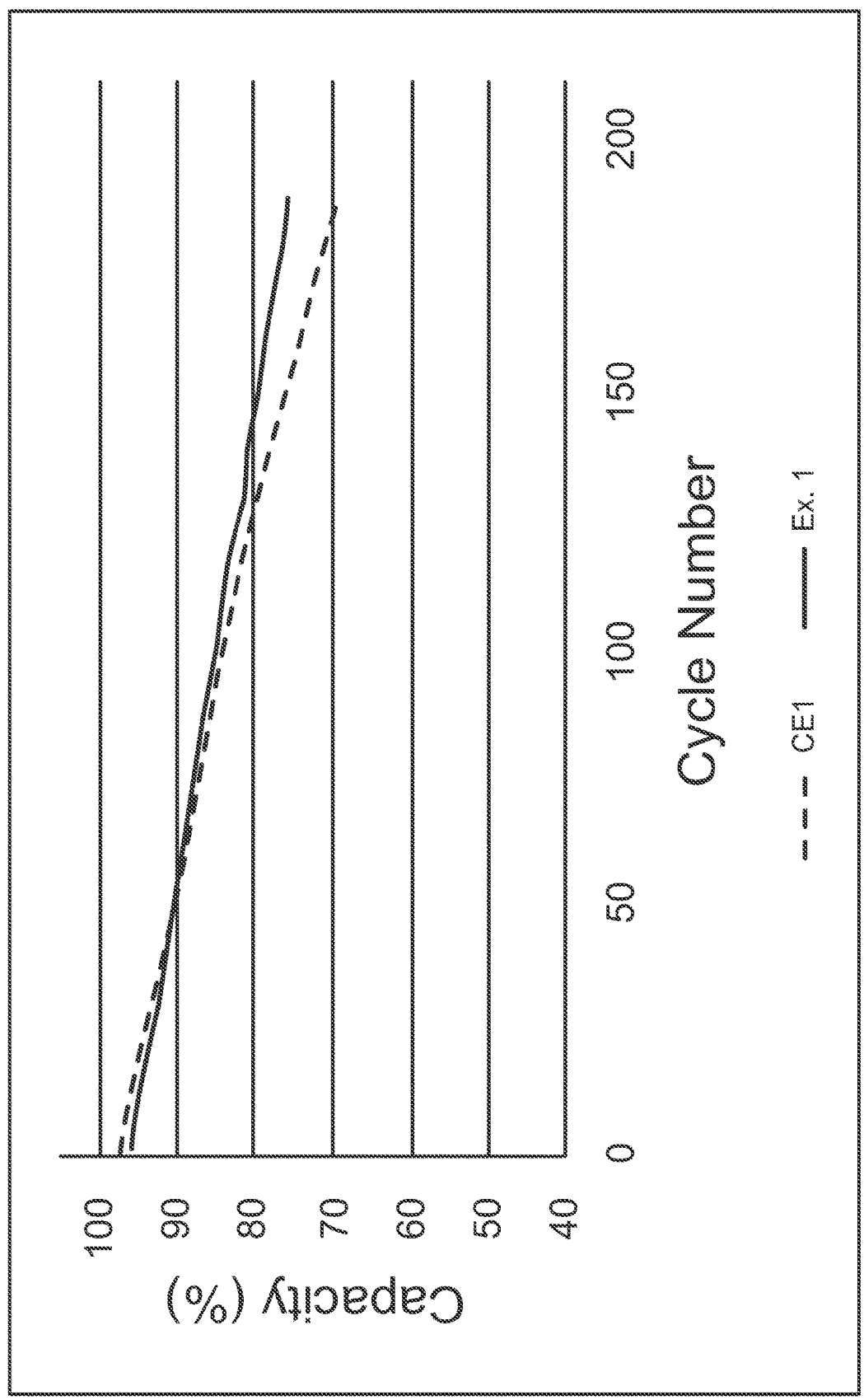
FIG. 12 includes battery cycle life test results for Ex. 1 compared to CE1.

FIG. 12 shows the PVP:$Al_2O_3$ coating improves the cycle life of the coated separator. Cycle life may be important in high energy, high power lithium ion batteries for long cycling lifetime.

Certain preferred PVP-ceramic coating formulations were found to include the homopolymer PVP where the additive PVA is added in a preferred range, such as the ratios described in detail above.

The preferred range of $Al_2O_3$ ceramic particles in the PVP coating is in the range of 60 to 99% by weight, more preferably in the range of 70 to 99% and most preferably in the range of 80 to 99% by weight.

An optimal coating layer thickness may be in the range of 1 to 8 μm, more preferably in the range of 2 to 6 μm and most preferably in the range of 2 to 4 μm.

Certain optimal PVP ceramic coatings on polyolefin microporous membranes may have certain preferred separator performance properties, including, but not limited to:
1) A Gurley value in a range that includes 500 sec/100 cc.
2) Wetting of membrane: excellent.
3) Electrolyte stability indicating low oxidation of binder by the electrolyte: excellent.
4) MD/TD % thermal shrinkage in a range that includes 3/2 at 150° C. for 10 minutes.

Test Methods

Thickness

Thickness is measured using the Emveco Microgage 210-A precision micrometer thickness tester according to test procedure ASTM D374. Thickness values are reported in units of micrometers, Puncture Strength Test samples are first pre-conditioned to 73.4 degrees C. and a relative humidity of 50% for a minimum of 20 minutes. An Instron Model 4442 is used to measure puncture strength of test sample based on ASTM D3763. Thirty measurements are made across the diagonal direction of a 1¼"×40" continuous sample specimen and averaged. The needle has a 0.5 mm radius. The rate of descent is 25 mm/min. The film is held tight in a clamping device which utilizes an O-ring to securely hold the test sample in place. The diameter of this secured area is 25 mm. The displacement (in mm) of the film that was pierced by the needle is recorded against the resistance force (in gram force) developed by the tested film. The maximum resistance force is the puncture strength in units of gram force (gf). A load-versus-displacement plot is produced by this test method.

Loading of Coating Layer

Loading of Coating Layer is measured using ASTM D3776 and the units are expressed in gsm or mg/cm$^2$.

Gurley

Gurley (JIS P 8117) is defined as the time in seconds required for 100 cc of air to pass through one square inch of a porous material at a constant pressure of 4.8 inches of water.

Electrical Resistance (ER) (also known as Ionic Resistance, IR)

Electrical Resistance is defined as the Resistance value in ohm-cm' of a separator filled with electrolyte. The units of electrical resistance are ohm-cm'. The separator resistance is characterized by cutting small pieces of separators from the finished material and then placing them between two blocking electrodes. The separators are saturated with the battery electrolyte with 1.0 M LiPF$_6$ salt in EC/EMC solvent of 3:7 ratio by volume. The Resistance, R, in Ohms ($\Omega$), of the separator is measured by a 4-probe AC impedance technique. In order to reduce the measurement error on the electrode/separator interface, multiple measurements are needed by adding more layers. Based on the multiple layer measurements, the electric (ionic) resistance, $R_s$ ($\Omega$), of the separator saturated with electrolyte is then calculated by the formula $R_s=p_s l/A$ where $p_s$ is the ionic resistivity of the separator in $\Omega$-cm, A is the electrode area in cm$^2$ and l is the thickness of the separator in cm. The ratio $p_s/A$=is the slope calculated for the variation of the separator resistance ($\Delta R$) with multiple layers ($\Delta\delta$) which is given by slope=$p_s/A=\Delta R/\Delta\delta$.

Thermal Shrinkage

Shrinkage is measured by placing a coated test sample between two sheets of paper which is then clipped together to hold the sample between the papers and suspended in an oven. For the "130° C. for 1 hour" testing, a sample is placed in an oven at 130° C. for 1 hour. For the "150° C. for 10 minutes" testing, a sample is placed in the oven at 150° C. for 10 minutes. For the "150° C. for 1 hour" testing, a sample is placed in the oven at 150° C. for 1 hour. After the designated heating time in the oven, each sample was removed and taped to a flat counter surface using double side sticky tape to flatten and smooth out the sample for accurate length and width measurement. Shrinkage is measured in the both the machine direction (MD) and transverse direction (TD) direction and is expressed as a % MD shrinkage and % TD shrinkage.

Dielectric Breakdown (DB)

Voltage is applied to a separator membrane until the dielectric breakdown of the sample is observed. Strong separators show high DB. Non-uniformity in the separator membrane may lead to lower DB values.

Hot ER

Hot Electrical Resistance is a measure of resistance of a separator film while the temperature is linearly increased. The rise in resistance measured as impedance corresponds to a collapse in pore structure due to melting or "shutdown" of the separator membrane. The drop in resistance corresponds to opening of the separator due to coalescence of the polymer; this phenomenon is referred to as a loss in "melt integrity". When a separator membrane has sustained high level of electrical resistance, this is indicative that the separator membrane may prevent electrode shorting in a battery.

Electrolyte Stability

A 3 to 5 gram size sample (if the sample is a membrane, it is cut into small pieces) is added to 20 ml of EC:EMC with 1 Molar LiPF$_6$ electrolyte in a covered container which is then placed in oven at a temperature of 60° C. for 4-5 days. Observations are recorded when the sample is initially placed inside the container containing the electrolyte and, the color change of the electrolyte, color change of the sample and any presence of gassing are recorded daily during the 4-5 day storage period.

Cyclic Voltammetry (CV)

Cyclic Voltammetry (CV) is performed in order to study the electrochemical stability of additive materials in a typical lithium ion battery electrolyte, 1M LiPF$_6$ in EC:EMC. Cyclic voltammetry is generally used to study the electrochemical properties of an analyte in solution. A sample is prepared as described in electrolyte stability testing, then the sample is subjected to CV testing.

Wetting

To test wetting of base membrane by the coating slurry, a drop of coating slurry is placed on the surface of a microporous membrane using an eye dropper and the wetting of the membrane by the slurry is observed and recorded.

To test wetting of coated inventive membrane by an electrolyte, a drop of electrolyte is placed on the surface of a coated microporous membrane using an eye dropper and the wetting of the membrane by the electrolyte is observed and recorded.

The present invention may be embodied in other forms without departing from the spirit and the essential attributes thereof, and, accordingly, reference should be made to the appended claims, rather than to the foregoing specification, as indicating the scope of the invention. Additionally, the invention disclosed herein suitably may be practiced in the absence of any element which is not specifically disclosed herein.

I claim:

1. A coated battery separator comprising:
   a battery separator comprising a tri-layered base membrane; and
   a coating on one or two sides of the battery separator, wherein the coating comprises polyvinyl alcohol (PVA), ceramic particles and vinyl pyrrolidone co-vinyl acetate copolymer (Poly(VP-co-Vac)) having a ratio of Poly(VP-co-Vac) to PVA of 1:0.1.

2. The coated battery separator of claim 1, wherein the coating is on one side of the battery separator.

3. The coated battery separator of claim 1, wherein the coating is on two sides of the battery separator.

4. The coated battery separator of claim 1, wherein the coating is a ceramic coating, and the polymer is a binder for the ceramic coating.

5. The coated battery separator of claim 4, wherein the ceramic comprises silicon oxide (SiO$_2$), aluminum oxide (Al$_2$O$_3$), boehmite (Al(O)OH), zirconium oxide, titanium dioxide (TiO$_2$), barium sulfate (BaSO$_4$), oxides of transition metals, or mixtures thereof.

6. The coated battery separator of claim 1, wherein the ceramic particles are Al$_2$O$_3$.

7. The coated battery separator of claim 6, wherein the ratio of Al$_2$O$_3$ to Poly(VP-co-Vac) is 95:5.

8. The coated battery separator of claim 1, wherein the coating is formed using an aqueous medium.

9. The coated battery separator of claim 4, wherein the coating is formed using an aqueous medium.

10. The coated battery separator of claim 6, wherein the coating is formed using an aqueous medium.

11. The coated battery separator of claim 3, wherein the coating is formed using an aqueous medium.

12. A lithium ion battery comprising the coated battery separator of claim 1.

13. A lithium ion battery comprising the coated battery separator of claim 4.

14. The coated battery separator of claim 1, wherein the tri-layered base membrane has a polypropylene/polyethylene/polypropylene structure.

* * * * *